United States Patent [19]
Geisler et al.

[11] 3,899,919
[45] Aug. 19, 1975

[54] ACOUSTIC EMISSION SYSTEM FOR SOLID PROPELLANT BURN RATE MEASUREMENTS

[75] Inventors: Robert L. Geisler, Tehachapi; James L. Koury; Arch D. Johnston, both of Lancaster, all of Calif.

[73] Assignee: The United States of America as represented by the Secretary of the Air Force, Washington, D.C.

[22] Filed: Dec. 21, 1973

[21] Appl. No.: 427,159

[52] U.S. Cl. .................................................. 73/35
[51] Int. Cl.² ........................................ G01N 33/22
[58] Field of Search ................................. 73/35

[56] References Cited
UNITED STATES PATENTS

| | | | |
|---|---|---|---|
| 2,681,563 | 6/1954 | Golden | 73/35 |
| 3,027,751 | 4/1962 | Jones | 73/35 |
| 3,447,378 | 6/1969 | Dunegan et al | 73/35 X |

OTHER PUBLICATIONS

"Direct Determination of Burning Rates of Propellant Powders" by Crawford et al., from Analytical Chemistry, Feb. 1947, pp. 630–633.

*Primary Examiner*—James J. Gill
*Attorney, Agent, or Firm*—Joseph E. Rusz; Henry S. Miller, Jr.

[57] ABSTRACT

In a solid strand burn rate analyzer for measuring solid propellant burn rates, sensing acoustic signals created by thermal fracture or deflagration of the solid oxidizer utilizing a piezoelectric pick-up transducer mounted on the propellant case, a system of signal amplification, a wave form distribution converter and a X, Y strip chart for recording test results.

1 Claim, 1 Drawing Figure

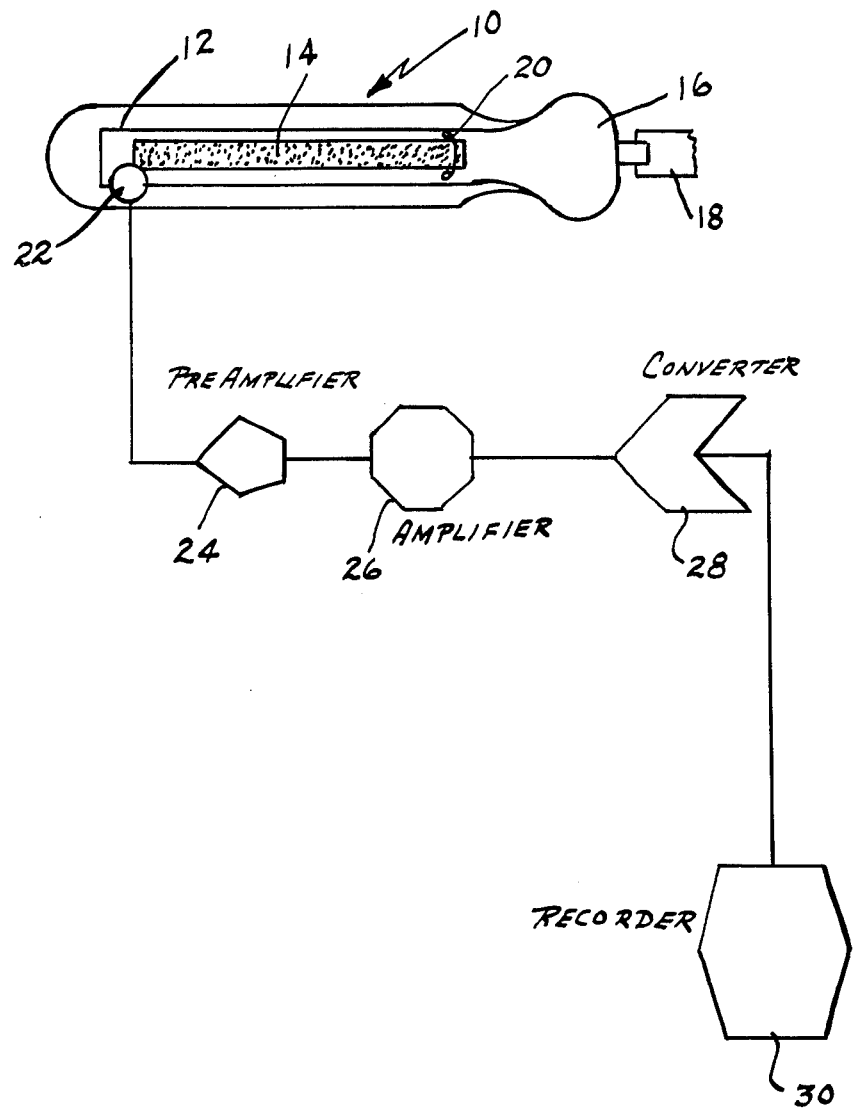

ACOUSTIC EMISSION SYSTEM FOR SOLID PROPELLANT BURN RATE MEASUREMENTS

BACKGROUND OF THE INVENTION

This invention relates generally to the measurement of burn rate times in solid propellants and more particularly to the measurement of acoustic signals created by thermal fracture or deflagration of a solid oxidizer in the propellant.

Safety, as well as accuracy, form a basis and a need for the most careful determination possible of the burn rates in solid propellants. Many methods and devices have been suggested in prior art for achieving this goal, however each proposed system has a disadvantage ranging from complexity to cost which limits its overall effectiveness.

Examples of known systems and method include those which monitor the time to consume a fixed length of propellant, either by burning through a pre-placed trip wire and thereby opening an electrical circuit and by monitoring the rate of pressure rise in a closed vessel. Gravimetric, microwave, cinematographic x-ray, and photo cell devices have been used in specialized research applications, but have not been widely used in industry due to cost and complexity.

Solid propellants burn at rates ($r$) determined by their composition and the ambient pressure (P) of the chamber in which they are combusting. Accurate measurement of the burning rate is a key factor in the formulation, production, quality control, and application of solid propellants relative to use in solid rocket motors and gas generation. This data is needed in the form of the empirical equation $r = ap^n$ where $r =$ linear burning rate, $p =$ chamber pressure and $a$ and $n$ are constants over an experimentally determined pressure range.

SUMMARY OF THE INVENTION

The invention utilizes components known in the art in a combination that produces unexpected accuracy in the measurement of propellant burn rate time. The system involves the discovery of acoustic signals created by either the thermal fracture of the solid oxidizer, or its deflagration in propellant as it is exposed to the combustion flame zone at the burning surface. The system uses a special acoustic sensor mounted externally to the combustion vessel in a test apparatus to monitor the time required for the flame to consume a known length of the propellant at a preset pressure.

The system of the invention may be used to monitor burn rates (time) on any device containing solid propellant. However, specific application has been made on the Crawford Solid Strand burn rate analyzer, a device known in the art and presently commercially available. A piezoelectric acoustic pickup transducer is affixed to the case of the propellant within the analyzer. The transducer is then connected by conventional means to an amplifying system for producing a signal which is then sent to a readout device in the form of an X, Y strip chart or plot recorder. The invention as described then senses the signals given off by the thermal fracture or deflagration of the solid oxidizer. These measurements have been found to be more accurate in determining burn rates than any hitherto known.

It is therefore an object of the invention to provide a new and improved system for measuring burn rate times in solid propellants.

It is another object of the invention to provide a new and improved method for measuring burn rate times in solid propellants.

It is a further object of the invention to provide a system for measuring burn rate times in propellants that is less complex to install and easier to use than hitherto known devices.

It is still another object of the invention to provide a new and improved system for measuring burn rate times in solid propellants that is more reliable than any known similar devices.

It is still a further object of the invention to provide a new and improved system for measuring burn rate times in solid propellants that is more accurate than any known prior art devices.

It is another object of the invention to provide a new and improved system for measuring burn rate times in solid propellants that will measure unexpected changes in burn rate, thereby detecting flaws in the propellant.

It is another object of the invention to provide a new and improved system for measuring burn rate times in solid propellants that provides information in real time code.

It is another object of the invention to provide a new and improved system for measuring burn rate times in solid propellants which is economical to produce and utilizes conventional, currently available components that lend themselves to standard mass production manufacturing techniques.

These and other advantages, features and objects of the invention will become more apparent from the following discription taken in connection with the illustrative embodiment in the accompanying drawing.

DESCRIPTION OF THE DRAWING

The FIGURE is a schematic representation of the system of the invention.

DESCRIPTION OF THE PREFERRED EMBODIMENT

Referring now to the FIGURE a test chamber, as for example, a Crawford Solid Strand burn rate analyzer manufactured by the Atlantic Research Corporation, Alexandria, Virginia is shown generally at 10. Within the chamber is a propellant casing 12 containing a solid propellant strand 14. Adjacent one end of the propellant strand is an enlarged portion of the analyzer referred to as a bomb head 16. Connected to the bomb head is an ignitor 18 which is connected through means not shown to the ignitor wire 20. Attached to the propellant case 12 within the test chamber is a 150 KHZ to 300 KHZ piezoelectric pick-up transducer 22. The placement of the device is critical to the operation of the system and its location on the case provides for maximum mechanical acoustical coupling. As the propellant burns a high frequency signal is generated which may be used directly to analyze the burn rate time by a variation in frequency. Alternatively, the signal is converted and the square root of the signal is amplitude analyzed to determine burn rate. The output from the transducer is sent to a 60 db single ended preamplifier 24 and thence to a 40 db single ended power amplified 26. From the amplifier the signal is sent to an AC/DC RMS wave form distribution converter 28. The original signal has now approximately 100 db gain boost and AC/DC conversion and the analog DC going signal is fed to a strip chart or plot recorder 30 for an X, Y graphic presentation.

It should be understood, of course, that the foregoing disclosure relates to only a preferred embodiment of the invention and that numerous modifications or alterations may be made therein without departing from the spirit and scope of the invention as set forth in the appended claims.

I claim:

1. A system for measuring the rate time of burn of solid propellants in a solid strand burn rate analyzer comprising: A propellant strand secured in an analyzing means; a piezoelectric pick-up transducing means affixed to said propellant strand for measuring thermal fracture and deflagration of the solid oxidizer; means connected to said transducing means for amplifying the output signal thereof; means connected to the amplifying means for converting an AC signal to a DC signal and providing a root mean squared wave form distribution signal, and graphic recording means connected to said converting means for presenting a visual display of the propellant burning rate.

* * * * *